United States Patent [19]

Popelak et al.

[11] 3,929,793

[45] Dec. 30, 1975

[54] CERTAIN PIPERAZINE-CONTAINING INDOLE COMPOUNDS

[75] Inventors: Alfred Popelak, Rimbach; Wolfgang Kampe, Heddesheim; Max Thiel, Mannheim; Karl Dietmann, Mannheim-Vogelstang; Gisbert Sponer, Hemsbach, all of Germany

[73] Assignee: Boehringer Mannheim G.m.b.H., Mannheim, Germany

[22] Filed: June 28, 1974

[21] Appl. No.: 484,354

[30] Foreign Application Priority Data
July 24, 1973 Germany............................ 2337461

[52] U.S. Cl............................ 260/268 BC; 424/250
[51] Int. Cl.²..................................... C07D 241/04
[58] Field of Search................. 260/268 BC, 326.15

[56] References Cited
UNITED STATES PATENTS
3,509,163  4/1970  Brandstrom et al. .......... 260/326.15
3,787,411  1/1974  Ruschig et al. ............... 260/268 BC Primary Examiner—Richard J. Gallagher
Attorney, Agent, or Firm—Burgess, Dinklage & Sprung

[57] ABSTRACT

New indole compound of the formula:

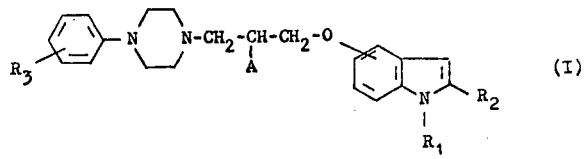

wherein
$R_1$ is hydrogen or alkyl;
$R_2$ is hydrogen, alkoxycarbonyl or carboxyl;
$R_3$ is hydrogen, halogen, alkyl, alkoxy or alkylthio; and
A is hydrogen or hydroxyl;

and the pharmacologically compatible salts thereof; are outstandingly effective in inducing blood pressure depression and thus are anti-hypertensive agents.

19 Claims, No Drawings

CERTAIN PIPERAZINE-CONTAINING INDOLE COMPOUNDS

The present invention is concerned with new indole compounds and with the therapeutic compositions containing them.

The new indole derivatives according to the present invention are compounds of the formula:

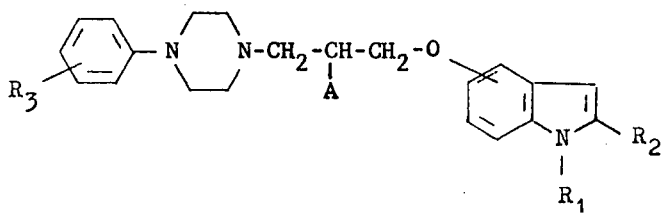

wherein
- $R_1$ is hydrogen or alkyl;
- $R_2$ is hydrogen, alkoxycarbonyl or carboxyl;
- $R_3$ is hydrogen, halogen, alkyl, alkoxy or alkylthio; and
- A is hydrogen or hydroxyl;

and the pharmacologically compatible salts thereof.

The compounds of formula (I) and the pharmacologically compatible salts thereof have a low toxicity and are characterized by outstanding blood pressure sinking and thus antihypertensive properties.

When $R_1$ and $R_3$ are alkyl, they can contain up to 6 and preferably up to 3 carbon atoms. The alkyl radicals in the alkoxy, alkoxycarbonyl and alkylthio radicals can contain up to 4 carbon atoms. The phenyl-piperazinyl-alkoxy radical is preferably in the 4- or 5-position of the indole ring.

The new compounds of formula (I) according to the present invention can be prepared, for example, by one of the following methods:

a. reaction of a compound of the formula:

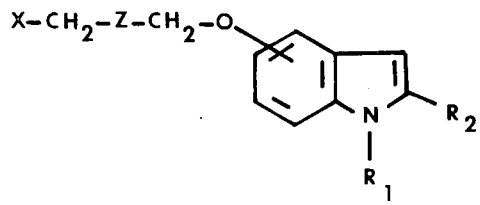

wherein
- $R_1$ and $R_2$ have the same meanings as above;
- Z is a > C=O or > CH—A group;
- A having the same meaning as above; and
- X is a reactive group or X and A together can represent an oxygen atom, with a compound of the formula:

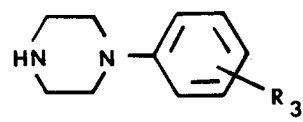

wherein
- $R_3$ has the same meaning as above; and, when Z is a > C=O group, reduction is subsequently carried out; or b. reaction of an indole derivative of the formula:

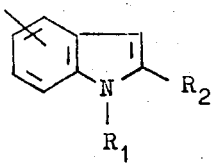

wherein
- $R_1$ and $R_2$ have the same meanings as above,
with a compound of the formula:

wherein
- $R_3$, Z and X have the same meanings as above, and, when Z is a > C=O group, reduction is subsequently carried out;

whereafter, when $R_2$ is a carboxyl group or an alkoxycarbonyl radical, the product obtained is, if desired, subsequently changed by esterification, saponification or transesterification and, if desired, the product obtained is converted into a pharmacologically compatible salt.

The reactive group X in the compound of formula (II) of (V) is preferably an acid residue, for example a residue of a hydrohalic or sulfonic acid.

The reaction of compounds of formula (II) with compounds of formula (III) according to process a), as well as that of compounds of formula (IV) with those of formula (V) according to process b), preferably takes place in an organic solvent which is inert under the reaction conditions, for example, ethanol, n-butanol, dioxan or dimethyl formamide. The reaction can also be carried out by mixing molar amounts of the reaction components and then either leaving the mixture to stand at ambient temperature or heating it.

The reaction of compounds of formula (IV) with those of formula (V) according to process b) is preferably carried out with the exclusion of oxygen and in the presence of an acid acceptor. However, it is also possible to use an alkali metal salt of the hydroxy compounds of formula (IV).

If it is necessary to carry out a reduction of the > C=O group, then this can be accomplished by catalytic hydrogenation or by means of other appropriate reducing agents, for example, complex metal hydrides, such as sodium borohydride. However, it is preferred to use catalytic hydrogenation with known catalysts, for example, noble metal catalysts or nickel catalysts, in conventional solvents, for example alcohols or dioxan.

If it is desired to saponify compounds of formula (I) in which $R_2$ is an alkoxycarbonyl radical, then this is carried out in the usual manner with aqueous bases or acids. The transesterification of compounds of formula (I) in which $R_1$ is an alkoxycarbonyl radical can also be carried out in conventional manner by reaction with an excess of an appropriate alcohol.

For the conversion of compounds of formula (I) into their pharmacologically compatible salts, they are preferably reacted with an equivalent amount of an inorganic or organic acid, for example, hydrochloric acid, hydrobromic acid, phosphoric acid, sulfuric acid, acetic acid, citric acid, maleic acid or the like, or, in the case of carboxylic acid derivatives, by neutralization with an inorganic or organic base, for example a basic alkali metal or alkaline earth metal compound, ammonia or an organic amine.

The following Examples are given for the purpose of illustrating the present invention:

EXAMPLE 1

Preparation of 5-{2-Hydroxy-3-[4-(2-methylphenyl)-piperazinyl-1]-propoxy}-indole A solution of 7.0 g 5-(2,3-epoxy-propoxy)-indole and 6.6 g 1-(2-methyl-phenyl)-piperazine in 200 ml ethanol was boiled for 4 hours. At the end of the reaction, the reaction mixture was evaporated, the residue was dissolved in methylene chloride and the solution obtained was chromatographed on 200 g basic aluminum oxide. The elution fractions obtained were evaporated and the residue of the base obtained was taken up in ether and acidified with a methanolic solution of maleic acid. The precipitate obtained was filtered off with suction and recrystallized from alcohol. There were obtained 10.7 g (60 percent of theory) 5-{2-hydroxy-3-[4-(2-methylphenyl)-piperazinyl-1]-propoxy}-indole maleate; m.p. 125°–128°C.

In an analogous manner, from 7.0 g 5-(2,3-epoxy-propoxy)-indole and 7.3 g 1-(2-chlorophenyl)-piperazine, there was obtained 5-{2-hydroxy-3-[4-(2-chlorophenyl)-piperazinyl-1]-propoxy}-indole in the form of its maleate; m.p. 165°–166°C.; yield 65 percent of theory.

The 5-(2,3-epoxy-propoxy)-indole used as starting material was prepared in the following manner:

13.3 g 5-hydroxyindole were dissolved in a mixture of 150 ml dioxan and 110 ml 1N aqueous sodium hydroxide solution, under an atmosphere of nitrogen. 30 g epichlorohydrin were added to this solution which was then stirred for 5 hours at 40°–45°C. When the reaction was finished, the reaction mixture was diluted with 1 liter water and shaken out four times with 300 ml methylene chloride. The methylene chloride phase was dried over anhydrous sodium sulfate and then evaporated. The residue obtained was chromatographed on 200 g aluminum oxide, using methylene chloride as eluant. After evaporation of the fractions obtained and recrystallization of the residue from ether-ligroin, there were obtained 12.5 g 5-(2,3-epoxypropoxy)-indole; m.p. 60°–62°C.

EXAMPLE 2

Preparation of 5-{2-Hydroxy-3-[4-(2-methoxyphenyl)-piperazinyl-1]-propoxy}-indole 7.0 g 5-(2,3-epoxy-propoxy)-indole, together with 7.1 g 1-(2-methoxy-phenyl)-piperazine, were boiled for 5 hours in 200 ml ethanol. The solution was thereafter evaporated in a vacuum and the residue was chromatographed on 200 g basic aluminum oxide, using methylene chloride as eluant. The fractions obtained were evaporated and the purified base obtained as residue was taken up in isopropanol and acidified with ethereal hydrochloric acid. The precipitated dihydrochloride of 5-{2-hydroxy-3-[4-(2-methoxy-phenyl)-piperazinyl-1]-propoxy}-indole was immediately filtered off with suction and recrystallized from ethanol. This salt melted at 215°–217°C. The yield was 10.5 g (62 percent of theory).

EXAMPLE 3

Preparation of 5-{2-Hydroxy-3-[4-(2-chlorophenyl)-piperazinyl-1]-propoxy}-1-methyl-indole 7.5 g 5-(2,3-epoxy-propoxy)-1-methyl-indole and 7.3 g 1-(2-chlorophenyl)-piperazine were heated under reflux for 5 hours in 200 ml ethanol. The ethanol was subsequently distilled off and the residue obtained was taken up in methylene chloride and then chromatographed on 200 g basic aluminum oxide. The residue obtained after distilling off the methylene chloride was first recrystallized from ether and thereafter from ethanol. There were obtained 8.9 g 5-{2-hydroxy-3-[4-(2-chlorophenyl)-piperazinyl-1]-propoxy}-1-methyl-indole; m.p. 90°–92°C.

In the same manner, from 7.5 g 5-(2,3-epoxy-propoxy)-1-methyl-indole and 7.1 g 1-(2-methoxy-phenyl)-piperazine, there was obtained, in a yield of 60 percent of theory, 5-{2-hydroxy-3-[4-(2-methoxy-phenyl)-piperazinyl-1]-propoxy}-1-methyl-indole; m.p. 82°–85°C.

The 5-(2,3-epoxy-propoxy)-1-methyl-indole used as starting material was prepared by reacting 5-hydroxy-1-methyl-indole with epichlorohydrin in a manner analogous to that described in Example 1 for the preparation of 5-(2,3-epoxy-propoxy)-indole. The 5-hydroxy-1-methyl-indole (m.p. 140°–142°C.) thereby used was obtained by the methylation of 5-benzyloxy-indole and subsequent debenzylation by catalytic hydrogenation in the presence of a palladium/charcoal catalyst.

EXAMPLE 4

Preparation of methyl 5-{2-hydroxy-3-[4-(2-chlorophenyl)-piperazinyl-1]-propoxy}-indole-2-carboxylate 7.4 g methyl 5-(2,3-epoxy-propoxy)-indole-2-carboxylate and 5.9 g 1-(2-chlorophenyl)-piperazine were heated for 4 hours in 150 ml methanol. Thereafter, the solution was concentrated to 50 ml and left to cool. The compound which thereby crystallized out was filtered off with suction and recrystallized from methanolmethylene chloride. There were obtained 8.5 g (64 percent of theory) methyl 5-{2-hydroxy-3-[4-(2-chlorophenyl)-piperazinyl-1]-propoxy}-indole-2-carboxylate; m.p. 138°–140°C.

In an analogous manner, from 4.2 g methyl 5-(2,3-epoxy-propoxyl)-indole-2-carboxylate and 3.4 g 1-(2-methoxy-phenyl)-piperazine, there was obtained, in a yield of 65 percent of theory, methyl 5-{2-hydroxy-3-[4-(2-methoxy-phenyl)-piperazinyl-1]-propoxy}-indole-2-carboxylate; m.p. 164°–166°C.

The methyl 5-(2,3-epoxy-propoxy)-indole-2-carboxylate used as starting material was prepared by the reaction of methyl 5-hydroxyindole-2-carboxylate with epichlorohydrin in a manner analogous to that described in Example 1 for the preparation of 5-(2,3-epoxy-propoxy)-indole. After recrystallization from ether-ligroin, this compound melted at 150°–152°C.

EXAMPLE 5

Preparation of
5-{2-hydroxy-3-[4-(2-methoxy-phenyl)-piperazinyl-1]-propoxy}-indole-2-carboxylic acid 5.7 g Methyl 5-{2-hydroxy-3-[4-(2-methoxy-phenyl)-piperazinyl-1]-propoxy}-indole-2-carboxylate (see Example 4) and 150 ml 1N methanolic sodium hydroxide solution were boiled for 2 hours. The reaction mixture was then concentrated and then treated with charcoal, filtered and weakly acidified with dilute acetic acid. The precipitate thereby formed was filtered off with suction and recrystallized from methanol. There were obtained 5 g (90 percent of theory) 5-{2-hydroxy-3-[4-(2-methoxy-phenyl)-piperazinyl-1]-propoxy}-indole-carboxylic acid; m.p. 263°–264°C.

EXAMPLE 6

Preparation of Methyl
5-{2-hydroxy-3-[4-(2-methyl-phenyl)-piperazinyl-1]-propoxy}-1-methyl-indole-2-carboxylate 5.2 g methyl 5-(2,3-epoxy-propoxy)-1-methyl-indole-2-carboxylate and 3.6 g 1-(2-methyl-phenyl)-piperazine were, together with 200 ml ethanol, heated under reflux for 5 hours. The reaction mixture was subsequently evaporated in a vacuum and the residue was recrystallized from ethanol. There were obtained 6.5 g (75 percent of theory) methyl 5-{2-hydroxy-3-[4-(2-methyl-phenyl)-piperazinyl-1]-propoxy}-1-methyl-indole-2-carboxylate; m.p. 128°C.

In an analogous manner, from 3.9 g methyl 5-(2,3-epoxy-propoxy)-1-methyl-indole-2-carboxylate and 3 g 1-(2-methoxy-phenyl)-piperazine, there were obtained 4.6 g (68 percent of theory) methyl 5-{2-hydroxy-3-[4-(2-methoxy-phenyl)-piperazinyl-1]-propoxy}-1-methyl-indole-2-carboxylate; m.p. 144°–146°C.; and from 6.5 g methyl 5-(2,3-epoxy-propoxy)-1-methyl-indole-2-carboxylate and 5 g 1-(2-chlorophenyl)-piperazine, there were obtained 6.3 g (55 percent of theory) methyl 5-{2-hydroxy-3-[4-(2-chlorophenyl)-piperazinyl-1]-propoxy}-1-methyl-indole-2-carboxylate; m.p. 132°C.

The methyl 5-(2,3-epoxy-propoxy)-1-methyl-indole-2-carboxylate used as starting material was prepared by the reaction of methyl 5-hydroxy-1-methyl-indole-2-carboxylate with epichlorohydrin in a manner analogous to that described in Example 1 for the preparation of 5-(2,3-epoxy-propoxy)-indole. After recrystallization from ethanol, the compound had a melting point of 90°–94°c.

The methyl 5-hydroxy-1-methyl-indole-2-carboxylate (m.p. 145°–146°C., after recrystallization from methanol) was obtained by the methylation of methyl 5-benzyloxy-indole-2-carboxylate and subsequent debenzylation by catalytic hydrogenation in the presence of a palladium/charcoal catalyst.

EXAMPLE 7

Preparation of
5-{3-[4-(2-Methoxy-phenyl)-piperazinyl-1]-propoxy}-indole

A solution of 6.65 g 5-hydroxyindole and 13.5 g 1-[4-(2-methoxy-phenyl)-piperazinyl-1]-3-chloropropane in 300 ml dioxan was, after the addition of 55 ml 1N aqueous sodium hydroxide solution, stirred for 10 hours at ambient temperature under an atmosphere of nitrogen. Subsequently, the solution was evaporated in a vacuum and the residue obtained was taken up in methylene chloride and chromatographed on 200 g basic methylene chloride. The residue obtained after the evaporation of the methylene chloride was recrystallized from ether/ligroin. There were obtained 8.4 g (46 percent of theory) 5-{3-[4-(2-methoxy-phenyl)-piperazinyl-1]-propoxy}-indole; m.p. 83°–85°c.

EXAMPLE 8

Preparation of Methyl
5-[3-(4-phenyl-piperazinyl-1)-propoxy]-1-methyl-indole-2-carboxylate 1 g sodium hydride was introduced into a solution of 8.2 g methyl 5-hydroxy-1-methyl-indole-2-carboxylate in 100 ml dimethyl formamide under an atmosphere of nitrogen. Thereafter, 10 g 1-(4-phenyl-piperazinyl-1)-3-chloropropane were added thereto and the reaction mixture was stirred for 12 hours at ambient temperature. The solution was thereafter evaporated to dryness under reduced pressure and the residue was taken up in 50 ml water and then shaken out with methylene chloride. The methylene chloride extracts were evaporated to dryness and the residue was recrystallized from ethanol. There were obtained 11 g (67 percent of theory) methyl 5-[3-(4-phenyl-piperazinyl-1)-propoxy]-1-methyl-indole-2-carboxylate; m.p. 167°–169°C.

In an analogous manner, from 8.2 g methyl 5-hydroxy-1-methyl-indole-2-carboxylate and 11 g 1-[4-(2-methoxy-phenyl)-piperazinyl-1]-3-chloropropane, there were obtained 10.5 g (60 percent of theory) methyl 5-{3-[4-(2-methoxy-phenyl)-piperazinyl-1]-propoxy}-1-methyl-indole-2-carboxylate.

EXAMPLE 9

Preparation of
4-{2-Hydroxy-3-[4-(2-methoxy-phenyl)-piperazinyl-1]-propoxy}-indole 5.8 g 4-(2,3-epoxy-propoxy)-indole, 5.9 g 1-(2-methoxy-phenyl)-piperazine and 25 ml n-butanol were boiled for 30 minutes. The reaction solution was then evaporated in a vacuum and the residue obtained taken up in ether. The crystals which precipitated out were filtered off with suction and recrystallized from ethanol. There were obtained 7.4 g (63 percent of theory) 4-{2-hydroxy-3-[4-(2-methoxy-phenyl)-piperazinyl-1]-propoxy}-indole; m.p. 145°–146°C.

EXAMPLE 10

Preparation of
4-{2-Hydroxy-3-[4-(2-chlorophenyl)-piperazinyl-1]-propoxy}-indole 5.8 g 4-(2,3-epoxy-propoxy)-indole, 6.0 g 1-(2-chlorophenyl)-piperazine and 25 ml n-butanol were boiled for 30 minutes. The reaction mixture was then evaporated to dryness and the residue obtained was dissolved in ether. To the ethereal solution thus obtained was added dropwise a solution of 3.6 g maleic acid in 25 ml methanol. The initially oily precipitate, which subsequently crystallized, was filtered off with suction and recrystallized from ethanol. There were obtained 11.5 g (70 percent of theory) 4-{2-hydroxy-3-[4-(2-chlorophenyl)-piperazinyl-1]-propoxy}-indole in the form of the maleate; m.p. 177°–178°C.

In an analogous manner, from 4-(2,3-epoxy-propoxy)-indole and 1-phenyl-piperazine, there was obtained, in a yield of 49 percent of theory, 4-[2-hydroxy-3-(4-phenyl-piperazinyl-1)-propoxy]-indole in the form of its maleate; m.p. 194°–196°C.; and from 4-(2,3-epoxy-propoxy)-indole and 1-(2-methyl-phenyl)-piperazine, there was obtained, in a yield of 66 percent of theory, 4-{2-hydroxy-3-[4-(2-methyl-phenyl)-piperazinyl-1]-propoxy}-indole in the form of its maleate; m.p. 164°–165°C.

EXAMPLE 11

Preparation of Ethyl 4-[2-hydroxy-3-(4-phenylpiperazinyl-1)-propoxy]-indole-2-carboxylate 7.5 g ethyl 4-(2,3-epoxy-propoxy)-indole-2-carboxylate and 4.9 g 1-phenyl-piperazine were boiled for 2–3 hours in 100 ml n-butanol. The precipitate which separated out upon cooling was filtered off with suction and recrystallized from ethylene glycol dimethyl ether. There were obtained 5.4 g (44 percent of theory) ethyl 4-[2-hydroxy-3-(4-phenyl-piperazinyl-1)-propoxy]-indole-2-carboxylate; m.p. 177°–179°C.

In an analgous manner, from ethyl 4-(2,3-epoxy-propoxy)-indole-2-carboxylate and 1-(2-chlorophenyl)-piperazine, there was obtained, in a yield of 62 percent of theory, ethyl 4-{2-hydroxy-3-[4-(2-chlorophenyl)-piperazinyl-1]-propoxy}-indole-2-carboxylate; m.p. 178°C; from ethyl 4-(2,3-epoxy-propoxy)-indole-2-carboxylate and 1-(2-methoxy-phenyl)-piperazine, there was obtained, in a yield of 46 percent of theory, ethyl 4-{2-hydroxy-3-[4-(2-methoxyphenyl)-piperazinyl-1]-propoxy}-indole-2-carboxylate; m.p 164°–167°C.; from ethyl 4-(2,3-epoxy-propoxy)-indole-2-carboxylate and 1-(3-bromophenyl)-piperazine, there was obtained, in a yield of 35 percent of theory, ethyl 4-{2-hydroxy-3-[4-(3-bromophenyl)-piperazinyl-1]-propoxy}-indole-2-carboxylate; m.p. 134°–135°C.; from ethyl 4-(2,3-epoxy-propoxy)-indole-2-carboxylate and 1-(2-methyl-phenyl)-piperazine, there was obtained, in a yield of 62 percent of theory, ethyl 4-{2-hydroxy-3-[4-(2-methylphenyl)-piperazinyl-1]-propoxy}-indole-2-carboxylate; m.p. 161°–162°C.; from ethyl 4-(2,3-epoxy-propoxy)-1-methyl-indole-2-carboxylate and 1-(2-methoxy-phenyl)-piperazine, there was obtained, in a yield of 25 percent of theory, ethyl 4-{2-hydroxy-3-[4-(2-methoxy-phenyl)-piperazinyl-1]-propoxy}-1-methyl-indole-2-carboxylate in the form of its maleate, which sintered at 60°C.; and from ethyl 4-(2,3-epoxy-propoxy)-1-n-propyl-indole-2-carboxylate and 1-(2-methoxy-phenyl)-piperazine, there was obtained, in a yield of 15 percent of theory, ethyl 4-{2-hydroxy-3-[4-(2-methoxy-phenyl)-piperazinyl-1]-propoxy}-1-n-propyl-indole-2-carboxylate; m.p. 97°–100°C.

The ethyl 4-(2,3-epoxy-propoxy)-1-methyl and -1-n-propyl-indole-2-carboxylates used as starting material were prepared by the reaction of ethyl 4-hydroxy-1-methyl- and -1-n-propyl-indole-2-carboxylate, respectively, with epichlorohydrin.

The ethyl 4-hydroxy-1-methyl-indole-2-carboxylate, as well as the corresponding 1-n-propyl compound, were obtained by the methylation and propylation, respectively, of ethyl 4-benzyloxy-indole-2-carboxylate and subsequent debenzylation by catalytic hydrogenation in the presence of a palladium/charcoal catalyst.

EXAMPLE 12

Preparation of 4-{2-Hydroxy-3-[4-(2-chlorophenyl)-piperazinyl-1]-propoxy}-indole-2-carboxylic acid 6.0 g ethyl 4-{2-hydroxy-3-[4-(2chlorophenyl)-piperazinyl-1]-propoxy}-indole-2-carboxylate and 1.0 g potassium hydroxide were boiled for 3 hours in 50 ml water. The reaction mixture was then rendered weakly acidic with dilute acetic acid and the precipitate which formed was filtered off with suction. After further purification by dissolving in a dilute aqueous solution of ammonia and precipitation by the addition of dilute hydrochloric acid, there were obtained 3.3 g (57 percent of theory) 4-{2-hydroxy-3-[4-(2-chlorophenyl)-piperazinyl-1]-propoxy}-indole-2-carboxylic acid; m.p. 225°–228°C.

In an analogous manner, from ethyl 4-{2-hydroxy-3-[4-(2-methoxy-phenyl)-piperazinyl-1]-propoxy -}indole-2-carboxylate, there was obtained, in a yield of 60 percent of theory, 4-{2-hydroxy-3-[4-(2-methoxy-phenyl)-piperazinyl-1]-propoxy {-indole-2-carboxylic acid, which sintered at 165°C.; and from ethyl 4-[2-hydroxy-3-(4-phenyl-piperazinyl-1)-propoxy]-indole-2-carboxylate, there was obtained, in a yield of 50 percent of theory, 4-[2-hydroxy-3-(4-phenyl-piperazinyl-1)-propoxy]-indole-2-carboxylic acid, in the form of its hydrate, which melted, with decomposition, at 255°–258°C.

EXAMPLE 13

Preparation of Ethyl 5-{2-hydroxy-3-[4-(2-methoxyphenyl)-piperazinyl-1]-propoxy}-1-propyl-indole-2-carboxylate 7.1 g ethyl 5-(2,3-epoxy-propoxy)-1-propyl-indole-2-carboxylate and 4.6 g 1-(2-methoxy-phenyl)-piperazine were boiled for 4 hours in 120 ml ethanol. After distilling off the ethanol, the residue obtained was chromatographed on 100 g basic aluminum oxide, using methylene chloride as eluant. The methylene chloride fractions were evaporated and the residue obtained was recrystallized from ethanol. There were obtained 7.4 g (64 percent of theory) 5-{2-hydroxy-3-[4-(2-methoxyphenyl)-piperazinyl-1]-propoxy}-1-propyl-indole-2-carboxylate; m.p. 104°c.

The ethyl 5-(2,3-epoxy-propoxy)-1-propyl-indole-2-carboxylate used as starting material (m.p. 62°–64°C,; after recrystallization from ether-ligroin) was prepared by the reaction of ethyl 5-hydroxy-1-propyl-indole-2-carboxylate with epichlorohydrin in a manner analogous to that described in Example 1 for the preparation of 5-(2,3-epoxy-propoxy)-indole. The ethyl 5-hydroxy-1-propyl-indole-2-carboxylate thereby used was, in turn, obtained by the reaction of ethyl 5-benzyloxy-indole-2-carboxylate with propyl iodide and subsequent debenzylation.

EXAMPLE 14

Preparation of 5-{2-Hydroxy-3-[4-(2-methylthiophenyl)-piperazinyl-1]-propoxy}-indole In a manner analogous to that described in Example 1, 4.7 g 5-(2,3-epoxy-propoxy)-indole were reacted with 6.2 g 1-(2-methylthiophenyl)-piperazine and the base obtained was converted into the maleate. After recrystallization from ethanol, the maleate of 5-{2-hydroxy-3-[4-(2-methylthiophenyl)-piperazinyl-1]-propoxy}-indole thus obtained melted at 151°–153°C. The yield was 53 percent of theory.

EXAMPLE 15

Preparation of Ethyl 4-{3-[4-(2-methoxyphenyl)-piperazinyl-1]-propoxy}-indole-2-carboxylate 10 g ethyl 4-(3-bromopropoxy)-indole-2-carboxylate, 9.3 g 1-(2-methoxyphenyl)-piperazine and 8.0 g N-ethyl diisopropylamine were boiled for 8 hours in 250 ml isopropanol. The precipitate which separated out after standing for 48 hours at ambient temperature was filtered off with suction and recrystallized from methanol/water, with the addition of active charcoal. There were obtained 11.9 g (90 percent of theory) ethyl 4-{3-[4-(2-methoxyphenyl)-piperazinyl-1]-propoxy}-indole-2-carboxylate; m.p. 140°–142°C.

The ethyl 4-(3-bromopropoxy)-indole-2-carboxylate used as starting material was prepared by the reaction of ethyl 4-hydroxy-indole-2-carboxylate (in the form of its monosodium salt) with 1,3-dibromopropane. After recrystallization from isopropanol, the compound melted at 165°–166°C.

EXAMPLE 16

Preparation of 4-{3-[4-(2-Methoxyphenyl)-piperazinyl-1]-propoxy}-indole-2-carboxylic acid 7.3 g ethyl 4-{3-[4-(2-methoxypheny)-piperazinyl-1]-propoxy}-indole-2-carboxylate and 0.7 g sodium hydroxide were boiled for 8 hours in a mixture of 100 ml water and 50 ml dioxan. Thereafter, no starting ester can be detected by thin layer chromatography. The dioxan was distilled off in a vacuum and the remaining aqueous phase was shaken up with ether and, after clarification with active charcoal, acidified by the addition of acetic acid. After further purification by dissolving in an aqueous solution of sodium hydroxide and precipitation with acetic acid, there were finally obtained 5.7 g (83 percent of theory) 4-{3-[4-(2-methoxyphenyl)-piperazinyl-1]-propoxy}-indole-2-carboxylic acid; m.p. 180°–182°C.

In an analogous manner, from ethyl 4-{3-[4-(2-chlorophenyl)-piperazinyl-1]-propoxy}-1-methyl-indole-2-carboxylate, there was obtained, in a yield of 80 percent of theory, 4-{3-[4-(2-chlorophenyl)-piperazinyl-1]-propoxy}-1-methyl-indole-2-carboxylic acid; m.p. 239°C.

The compounds of the invention constitute potent anti-hypertensive agents. The compounds have proved particularly effective in the treatment of patients with severe or sustained elevation of blood pressure, particularly diastolic pressure. The compounds are suitable for use in almost all forms of fixed and progressive hypertensive disease, including that in which blood pressure is moderately elevated. The compounds have also proved effective in renal hypertension, including hypertension secondary to pyelonephritis, glomerulonephritis and renal amyloidosis.

The compounds can be administered orally, as pills, tablets, capsules, powders and the like. The preferred form of oral administration is as tablet containing 1 to 20 mg of active compound.

The compounds can also be administered parenterally. Injection solutions containing 10 mg/ml of injection solution are preferred.

The dosage schedule is entirely dependent on the condition of the patient, his response to the treatment and whether or not he is ambulatory or hospitalized. The treatment should be begun with small doses (1 mg) and increased gradually depending upon the patient's response. The dosage can be increased at 5 to 7 day intervals until an average daily dose of 1 to 20 mg is reached. Only one dose a day is usually required.

In order to establish the effectiveness of the aminoguanidine compounds of the invention as agents for reducing blood pressure, a series of tests as follows were carried out.

The following were the test methods used:

The test animals were rats into which arterial catheters had been implanted in a sterile operation via the arteria femoralis into the aorta. It was possible to measure the animals' blood pressure in the awake state directly in the blood with a transducer (Statham Transducer Type TP 23 D 6) via a carrier frequency measuring bridge. The animals were treated by administration of 10 percent common salt (sodium chloride) in their feed and, starting on the sixth week of their life, two injections per week of 5 mg at a time of 11-deoxycorticosteroneacetate per animal and thus developed an arterial high pressure in the median with values of 190 to 130 mm Hg. The test compounds were soaked in tylose solution and administered to the animals as follows: After the blood pressure control values had been determined, the animals received the test compound perorally via a stomach tube, in a volume of 10 ml/kg, and measurements were taken 1 and 2 hours after oral application of the substance.

The results are set forth in the Table below. The values set forth in the Table represent in each case the median of ten individual measurements of blood pressure depression (in mm Hg.) per applied substance.

TABLE

| Test Compound | Dosage (mg/kg oral) | Blood Pressure Depression* |
|---|---|---|
| 5-{2-Hydroxy-3-[4-(2-methoxy-phenyl)-piperazinyl-1]-propoxy}-1-methyl-indole Methyl | 50 | −63 |
| 5-{2-Hydroxy-3-[4-(2-methoxy-phenyl)-piperazinyl-1]-propoxy}-indole-2-carboxylate | 50 | −32 |
| 5-{2-Hydroxy-3-[4-(2-methoxy-phenyl)-piperazinyl-1]-propoxy}-indole-2-carboxylic acid Methyl | 50 | −29 |
| 5-[3-(4-phenyl-piperazinyl-1)-propoxy]-1-methyl-indole-2-carboxylate Methyl | 50 | −36 |
| 5-{3-[4-(2-methoxyphenyl)-piperazinyl-1]-propoxy}-1-methyl-indole-2-carboxylate | 50 | −34 |
| 5-{2-Hydroxy-3-[4-(2-methoxy-phenyl-piperazinyl-1]-propoxy}-indole | 50 | −68 |
| 5-{2-Hydroxy-3-[4-(2-chlorophenyl)-piperazinyl-1]-propoxy}-1-methyl-indole Methyl | 50 | −34 |
| 5-{2-hydroxy-3-[4-(2-chlorophenyl)-piperazinyl-1]-propoxy}-indole-2-carboxylate | 50 | −25 |
| 5-{2-Hydroxy-3-[4-(2-chlorophenyl)-piperazinyl-1]-propoxy}-indole | 50 | −26 |

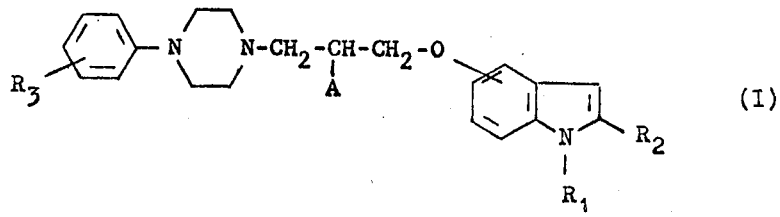

| Test Compound | Dosage (mg/kg oral) | Blood Pressure Depression* |
|---|---|---|
| 5-{2-Hydroxy-3-[4-(2-methyl-phenyl)-piperazinyl-1]-propoxy}-indole | 50 | −38 |
| 4-{2-Hydroxy-3-[4-(2-chlorophenyl)-piperazinyl-1]-propoxy}-indole | 50 | −33 |
| 4-[2-Hydroxy-3-(4-phenyl-piperazinyl-1)-propoxy]-indole | 50 | −30 |
| 4-{2-Hydroxy-3-[4-(2-methyl-phenyl)-piperazinyl-1]-propoxy}-indole | 50 | −43 |
| 4-{2-Hydroxy-3-[4-(2-chlorophenyl)-piperazinyl-1]-propoxy}-indole-2-carboxylic acid | 50 | −35 |
| 4-{2-Hydroxy-3-[4-(2-methoxy-phenyl)-piperazinyl-1]-propoxy}-indole-2-carboxylic acid | 50 | −38 |
| Ethyl 4-{3-[4-(2-methoxyphenyl)-piperazinyl-1]-propoxy}-indole-2-carboxylate | 50 | −63 |
| 4-{3-[4-(2-Methoxyphenyl)-piperazinyl-1]-propoxy}-indole-2-carboxylic acid | 50 | −42 |
| 5-{2-Hydroxy-3-[4-(2-methylthiophenyl)-piperazinyl-1]-propoxy}-indole | 25 | −26 |
| Ethyl 4-{2-Hydroxy-3-4-(2-methoxyphenyl)-piperazinyl-1]-propoxy}-1-methyl-indole-2-carboxylate | 50 | −34 |
| α-Methyl-Dopa | 100 | −15 |

*arterial median blood pressure depression in mm Hg (2 hours after application).

It can be seen from the Table that, whereas the comparative substance α-Methyl-Dopa (L-3-(3.4-dihydroxyphenyl)-2-methylalanine) only lowered the blood pressure by 15 mm Hg, all of the inventive compounds were more strongly active at half of this dosage, i.e., at 50 mg/kg, orally, than the comparative compound. The conclusion must be drawn from these results that the tested compounds offer an advantage as blood pressure lowering substances over α-Methyl-Dopa in high blood pressure therapy.

The present invention also provides pharmaceutical compositions which contain at least one of the new compounds in admixture with a solid or liquid pharmaceutical diluent or carrier and, if desired, also with ordoriferous, flavoring and/or coloring materials, followed by forming into, for example, tablets or dragees or, with the addition of appropriate adjuvants, suspended or dissolved in water or oil, for example olive oil.

It will be understood that the specification and examples are illustrative but not limitative of the present invention and that other embodiments within the spirit and scope of the invention will suggest themselves to those skilled in the art.

What is claimed is:
1. Indole compound of the formula:

wherein
$R_1$ is hydrogen or alkyl;
$R_2$ is hydrogen, alkoxycarbonyl or carboxyl;
$R_3$ is hydrogen, halogen, alkyl, alkoxy or alkylthio; and
A is hydrogen or hydroxyl;
wherein the alkyl moieties contain no more than six carbon atoms each;
and the pharmacologically acceptable salts thereof.

2. Indole compound as claimed in claim 1 wherein $R_1$ is hydrogen.
3. Indole compound as claimed in claim 1 wherein $R_1$ is alkyl of up to 3 carbon atoms.
4. Indole compound as claimed in claim 1 wherein $R_2$ is hydrogen.
5. Indole compound as claimed in claim 1 wherein $R_2$ is alkoxycarbonyl of up to 5 carbon atoms.
6. Indole compound as claimed in claim 1 wherein $R_2$ is carboxyl.
7. Indole compound as claimed in claim 1 wherein $R_3$ is hydrogen.
8. Indole compound as claimed in claim 1 wherein $R_3$ is halogen.
9. Indole compound as claimed in claim 1 wherein $R_3$ is alkyl of up to 3 carbon atoms.
10. Indole compound as claimed in claim 1 wherein $R_3$ is alkoxy of up to 4 carbon atoms.
11. Indole compound as claimed in claim 1 wherein $R_3$ is alkylthio of up to 4 carbon atoms.
12. Indole compound as claimed in claim 1 wherein A is hydrogen.
13. Indole compound as claimed in claim 1 wherein A is hydroxyl.
14. Indole compound as claimed in claim 1 designated 5-{2-hydroxy-3-[4-(2-methoxyphenyl)-piperazinyl-1]-propoxy}-indole.
15. Indole compound as claimed in claim 1 designated 5-{2-hydroxy-3-[4-(2-methoxyphenyl)-piperazinyl-1]-propoxy}-1-methyl-indole.
16. Indole compound as claimed in claim 1 designated 4-{2-hydroxy-3-[4-(2-methyl-phenyl)-piperazinyl-1]-propoxy}-indole.
17. Indole compound as claimed in claim 1 designated 5-{2-hydroxy-3-[4-(2-methylthiophenyl)-piperazinyl-1]-propoxy}-indole.
18. Indole compound as claimed in claim 1 designated ethyl 4-{3-[4-(2-methoxyphenyl)-piperazinyl-1]-propoxy}-indole-2-carboxylate.
19. Indole compound as claimed in claim 1 designated 4-{3-[4-(2-methoxyphenyl)-piperazinyl-1]-propoxy}-indole-2-carboxylic acid.

* * * * *